(12) United States Patent
Plodinec et al.

(10) Patent No.: US 9,244,095 B2
(45) Date of Patent: Jan. 26, 2016

(54) METHOD AND DEVICE FOR CONTROLLING A SCANNING PROBE MICROSCOPE

(71) Applicant: UNIVERSITAT BASEL, Basel (CH)

(72) Inventors: Marija Plodinec, Basel (CH); Marko Loparic, Basel (CH); Roderick Y H Lim, Riehen (CH)

(73) Assignee: UNIVERSITAT BASEL, Basel (CH)

( * ) Notice: Subject to any disclaimer, the term of this patent is extended or adjusted under 35 U.S.C. 154(b) by 0 days.

(21) Appl. No.: 14/364,309

(22) PCT Filed: Dec. 12, 2012

(86) PCT No.: PCT/EP2012/075295
§ 371 (c)(1),
(2) Date: Jun. 11, 2014

(87) PCT Pub. No.: WO2013/087726
PCT Pub. Date: Jun. 20, 2013

(65) Prior Publication Data
US 2014/0338073 A1   Nov. 13, 2014

(30) Foreign Application Priority Data
Dec. 12, 2011   (EP) .................................... 11193120

(51) Int. Cl.
*G01Q 10/00* (2010.01)
*G01Q 10/06* (2010.01)
*B82Y 35/00* (2011.01)

(52) U.S. Cl.
CPC ................ *G01Q 10/06* (2013.01); *B82Y 35/00* (2013.01); *G01Q 10/065* (2013.01)

(58) Field of Classification Search
CPC ....... G01Q 10/00; G01Q 10/02; G01Q 10/04; G01Q 10/045; G01Q 10/06; G01Q 10/065; G01Q 20/00; G01Q 20/02; G01Q 20/04
USPC ...................................... 850/1, 2, 3, 4, 5, 6, 7
See application file for complete search history.

(56) References Cited

U.S. PATENT DOCUMENTS

| | | | |
|---|---|---|---|
| 2007/0220958 A1* | 9/2007 | Gotthard et al. | ................ 73/105 |
| 2008/0149832 A1* | 6/2008 | Zorn | .............................. 250/311 |
| 2008/0245139 A1 | 10/2008 | Morimoto et al. | |

FOREIGN PATENT DOCUMENTS

| | | |
|---|---|---|
| JP | 2000-088733 | 3/2000 |
| JP | 2000-097840 | 4/2000 |

* cited by examiner

*Primary Examiner* — Nicole Ippolito
(74) *Attorney, Agent, or Firm* — JMB Davis Ben-David (57) ABSTRACT

The present invention relates to a method for controlling a scanning probe microscope having a probe (2) with a tip (21) for interacting with a sample (4), and a nanoscanner (1) for retaining the sample (4) or the probe (2), comprising the steps of monitoring the extension of the piezo element (1) along a first direction (R) along which the tip (21) is moved towards the sample (4), and adjusting the level of the probe (2) along the first direction (R) by means of an additional actuator (3), when the nanoscanner (1) exhibits an extension below or above a threshold value. The invention further relates to a device (100) for controlling a scanning probe microscope.

24 Claims, 6 Drawing Sheets

METHOD AND DEVICE FOR CONTROLLING A SCANNING PROBE MICROSCOPE

CROSS-REFERENCE TO RELATED APPLICATIONS

This is the U.S. National Stage of International Application No. PCT/EP2012/075295, filed Dec. 12, 2012, which was published in English under PCT Article 21(2), which in turn claims the benefit of European Patent Application No. 11193120.0 filed on Dec. 12, 2011.

The present invention relates to a method and a device for controlling a scanning probe microscope.

Scanning probe microscopy and particularly atomic force microscopy (AFM) are valuable methods in life sciences. AFM-based indentation testing is an important technique for inspecting mechanical properties of a great variety of samples. Biological tissue samples, however, comprise surface features that give rise to large surface roughness. This roughness can exceed the maximal range of the vertical movement or extension of a nanoscanner ("nanoscanner" is used in the following as a generalized term for a piezo element, voice coil motor or similar device that controls the scanning probe microscope).

Such nanoscanners, in particular piezo elements, usually exhibit a range of motion that can vary between 5 µm and 100 µm depending on manufacturer design. The main role of the nanoscanner is to maintain a user-specified interaction force between the probe tip, more precisely a cantilever tip, and the sample under examination by vertically lifting or lowering the cantilever (TOP-DOWN setup) or sample (BOTTOM-UP setup). In the TOP-DOWN setup, the cantilever or cantilever assembly is directly coupled to the piezo element. The sample or the sample holder does not move. In the BOTTOM-UP setup, the sample or the sample holder is directly coupled to the piezo element. The cantilever assembly remains stationary. Alternatively, the sample may be moved in the vertical direction by a piezo element (BOTTOM-UP), while the cantilever is moved by an additional piezo element in horizontal direction (TOP-LATERAL). Or, in a yet another configuration, the cantilever may be moved in the vertical direction by a piezo element (TOP-DOWN), while the sample is moved by an additional piezo element in horizontal direction (BOTTOM-LATERAL).

In this manner, the nanoscanner maintains a constant tip-sample force during sample scanning (i.e. force mapping) by moving the sample or the cantilever in the vertical direction. Force curves are usually recorded on, but not limited to, scanning areas ranging from 10 µm×10 µm to 150 µm×150 µm on neighbouring indentation spots with a spacing of about 1 µm. To record force curves, the nanoscanner extends (cantilever is going towards the sample) until the cantilever is bent to reach a given force on the sample. This yields the 'trace' curve. Subsequently, the nanoscanner retracts a certain distance, yielding the 'retrace' curve and then moves on to the next indentation spot.

Problems occur when the corrugations (sample unevenness in the z-axis) of the sample surface on the scanning area are larger than the range of the given nanoscanner in the z-axis (5 µm to 100 µm). Hence, in case of a TOP-BOTTOM setup, if the corrugations are too large, the piezo element will either extend or retract completely. The cantilever will lose contact if the piezo element is fully extended but the sample surface is still descending. On the other hand, the force of the cantilever will increase over the given force maximum if the piezo element is already fully retracted but the sample surface is still ascending. The cantilever tip is then literally pressed into the sample surface. In both cases, the above mentioned constant tip-sample force is not maintained. For BOTTOM-UP setups, the directions are reversed.

Based on this background it is the objective of the present invention to provide methods and means for controlling a scanning probe microscope, in a particular for measurements of samples characterized by large surface corrugations or roughness.

The solution provided by the present invention is to monitor the movement or extension of the piezo element and shift the relative or absolute height level of the cantilever by external motors or actuators when the piezo element reaches its limits, or when it is within a predefined range in proximity to these limits. An additional module was developed that allows for the indentation testing of very rough samples. On every single indentation spot, the complete movement or extension of the nanoscanner was recorded and analysed.

According to one aspect of the invention, a method for controlling a scanning probe microscope having a probe with a tip for interacting with a sample and a nanoscanner for retaining the sample or the probe is provided, comprising the steps of:
- monitoring the extension of the nanoscanner along a first direction (z-axis) along which the tip is moved towards the sample, and
- adjusting a level of the probe along the first direction by means of an additional actuator, when the nanoscanner exhibits an extension below or above a threshold value.

Such scanning probe microscope is configured to form images or maps of sample surfaces using a physical probe that scans the sample. Such images may be obtained by mechanically moving the probe in a raster scan, along a line or a grid of points and registering the probe-surface interaction.

In some embodiments, the scanning probe microscopes is selected from the group comprised of an atomic force microscope, a chemical force microscope, a conductive atomic force microscope, a scanning tunneling microscope and a magnetic force microscope.

In some embodiments, the scanning probe microscope has a resolving power of at least 1 µm. Resolving power in the context of the present specification refers to the minimal distance between points by which a scanning probe microscope is still able to discriminate between two points on a sample regarding their probed characteristics such as charge, magnetisation or a mechanical property. A resolving power of at least 1 µm means that the microscope is able to discriminate two points that are not more than 1 µm apart. A resolving power of at least 1 µm also encompasses higher resolving powers. A resolving power higher than 1 µm means that the microscope can discriminate two points having a distance smaller than 1 µm. Examples of resolving powers higher than 1 µm are 0.5 µm, 0.1 µm, 10 nm and 1 nm.

In some embodiments, such probe is configured to interact with a sample by electrons or forces such as van-der-Waals force, mechanical force, electrostatic force, adhesion force, frictional force or magnetic force.

In some embodiments, the probe is configured to register the interaction between the sample and the probe by detecting, for example electric currents, differences in electrical or chemical potentials, changes in the electrostatic capacitance or forces as described above.

In some embodiments, the probe is selected from the group comprised of a conductive scanning tip, a cantilever and an optical fibre.

In some embodiments, the probe can further be moved in a second and third direction (x-axis and y-axis) that extend orthogonally to the first direction (z) and is configured to scan the sample surface along the second or third direction (i.e. in the x-y plane).

In some embodiments, the probe is part of a probe assembly.

In some embodiments, such adjusting a level of the probe along the first direction is configured to prevent the probe tip from coming too close to the sample or from being too far away from the sample.

In some embodiments, adjustments are performed by lowering or lifting the probe or lowering a lifting the sample along the first direction.

In some embodiments, the sample is retained by a sample holder. A sample holder in the context of the present specification means a device or a support that is configured to retain a sample.

In some embodiments, the sample holder is a glass slide, a petri dish or a Teflon support.

A nanoscanner in the context of the present specification refers to a device for moving the sample or the probe with sub-micrometer or at least micrometer precision along the first direction described above. Submicrometer or micrometer precision in the context of the present specification means that the device can move the sample of the probe along the first direction in steps of not larger than 0.1 µm, 0.5 µm, 1 µm, 2 µm, 5 µm, 7 µm or 10 µm.

In some embodiments, the nanoscanner is a piezo element or a linear motor such as voice coil motor.

A piezo element in the context of the present specification refers to a body composed of a piezoelectric material that can be deformed by application of an electric current. Such piezo element is extendable and retractable along at least one direction.

In some embodiments, the piezo element is made of a suitable material such as crystal or ceramics, for example quartz, barium titanate, lead titanate, sodium tungstate, sodium niobate, lead zirconate titanate or bismuth ferrite.

In some embodiments, the piezo element is extendable or retractable within a range of 5, 10, 15, 20, 25, 30, 35, 40, 50, 60, 70, 80, 90 or 100 µm.

A voice coil motor in the context of the present specification refers to a motor comprising a magnetic housing and an electromagnetic coil that are movable in each other (the coil inside of the housing). Such electromagnetic coil comprises a conductive wire wound around a core. The application of a voltage across the terminals of the motor causes the motor to move to one direction, while reversing the polarity of the applied voltage will move the motor to the opposite direction. The extension of a voice coil motor in the context of the present specification refers to its stroke or lift, wherein the maximal extension refers to the maximal stroke or lift and the minimal extension to zero stroke or lift.

In some embodiments, the magnetic housing comprises a permanent magnet in a housing composed of iron.

In some embodiments, the voice coil motor additionally comprises a flexure hinge structure which may be used as a spring between the probe and the housing.

In some embodiments, the nanoscanner is directly coupled to the probe or to the probe assembly (TOP-DOWN setup).

In some embodiments, the nanoscanner is directly coupled to the sample or the sample holder (BOTTOM-UP setup).

Directly coupling in the context of the present specification refers to a physical connection between the nanoscanner and the probe, the probe assembly, the sample or the sample holder, wherein the physical connection is configured to enable the nanoscanner to move the probe, probe assembly, sample of sample holder in at least the first direction as described above.

In some embodiments, the nanoscanner is configured to move the probe, probe assembly, sample or sample holder in the second and third direction described above.

In some embodiments, such threshold value corresponds to the optimal working range of the nanoscanner, in particular of a piezo element, depending on construction, design or used material of the nanoscanner.

In some embodiments, the threshold value corresponds to the upper and lower limit of the nanoscanner optimal working range.

An actuator in the context of the present specification means a device for moving or controlling a mechanism or system different from the piezo element described above and which converts energy into motion.

In some embodiments, such actuator is operated by a source of energy such as electric current, hydraulic fluid pressure or pneumatic pressure.

In some embodiments, the actuator is selected from the group comprised of a pneumatic actuator, a hydraulic actuator, a piezoelectric actuator, a comb drive, a linear actuator or motor, an electroactive polymer or an electric motor such as servo motor, stepper motor or voice coil motor.

In one embodiment, the nanoscanner is designed—with respect to its extension—to maintain a constant probe tip-sample interaction force. Such force has been described above.

In one embodiment, the extension of the nanoscanner is configured to maintain a constant probe tip-sample distance.

In one embodiment, the extension of the nanoscanner is configured to maintain a constant indentation depth of the probe tip into the sample.

In one embodiment, the method according the above aspect and/or embodiments of the invention is performed in a measurement of a surface characterized by corrugations larger than the extension range of a given piezo element.

In one embodiment, the method is performed in a measurement of surface characterized by a corrugation larger than 5 µm, 10 µm, 15 µm, 20 µm, 25 µm, 30 µm, 35 µm, 40 µm, 50 µm, 60 µm, 70 µm, 80 µm, 90 µm or 100 µm.

In one embodiment, monitoring the extension of the nanoscanner according to the aspect and/or embodiments of the invention is performed in real time. Real time in the context of the present specification means that the time elapsing between extension of the nanoscanner and registration of the extension is not larger than 1 s, 0.1 s, 10 µs or 1 µs. A real time monitoring can enable a real time adjusting of the level of the probe, wherein the time elapsing between extension of the piezo element and adjusting the level of the probe is not larger than 1 µs, 10 µs, 100 µs, 1 s or 5 s.

In one embodiment, the probe described above is a cantilever.

A cantilever in the context of the present specification means a beam or arm that is anchored at only one end. Deflections of the cantilever caused by repulsive or attractive forces between the sample surface and the tip may be optically detected, for example by an interferometer or by a laser focused on the cantilever back, and reflected onto a split photodiode, wherein the photodiode registers the deflection of the cantilever as a voltage difference, which can be converted into nanometers. Alternatively, the deflection of the cantilever may be detected by a piezoelectric sensor, wherein the strain of the cantilever is converted into an electrical charge.

In one embodiment, the cantilever is part of a cantilever assembly.

In one embodiment, the cantilever is configured in a way that the tip of the cantilever is pressed towards the sample along the first direction described above by extension of the nanoscanner.

In some embodiments, the scanning probe microscope is an atomic force microscope having the cantilever.

In some embodiments, the method is used to perform AFM measurement on a sample surface that characterized by roughness or large corrugations.

In one embodiment, the method is used for AFM measurement of tissue samples such as biopsy samples.

In one embodiment, adjusting the level of the probe according to the above aspect and/or embodiments of the invention is performed by lowering or lifting the probe or lowering or lifting the sample.

In some embodiments, lowering or lifting according to the above embodiment is performed by directly coupling an actuator as described to the sample, the sample holder, the probe or the probe assembly, wherein the actuator is configured to move the sample, sample holder, the cantilever or the cantilever assembly along the first direction as described above.

In one embodiment, adjusting the level of the probe according to the above aspect and/or embodiments of the invention is automatically performed.

In one embodiment, such automatically adjusting is performed by the actuator described above or a programmed microprocessor that is configured to run the method according to any aspects or embodiments of the invention.

In one embodiment, the microprocessor is integrated into a device for scanning probe microscopy or is part of the actuator described above, a controller or a computer for operating the device.

In one embodiment, the programmed microprocessor is configured to monitor the extension of the piezo element and automatically start the actuator to adjust the level of the probe or the sample, when a defined threshold of extension is reached. The microprocessor is further configured to automatically stop the actuator, when a certain lowering or lifting distance along the first direction is reached.

In one embodiment, the level of the probe is adjusted, when the nanoscanner exhibits an extension lower than 5%, 10%, 15%, or 20% or higher than 80%, 85%, 90% or 95% of its maximal extension. Such embodiment offers the advantage of keeping the extension of the nanoscanner in the optimal working range between 5%, 10%, 15% or 20% and 80%, 85%, 90% or 95% of the maximal extension. At 0% of the maximal extension the nanoscanner is maximally retracted.

Maximal extension in the context of the present specification means the maximal length of a nanoscanner to which the nanoscanner can be extended by application of an electric current. Likewise, minimal extension or maximal retraction in the context of the present specification refers to minimal length of a nanoscanner to which the nanoscanner can be retracted by application of an electric current.

In one embodiment, the level of the probe is adjusted by lowering or lifting the probe or the sample by 5 to 30% of the maximal extension of the nanoscanner. Such embodiment offers the advantage of restoring the optimal working range of the piezo element.

In one embodiment, the level of the probe is adjusted by lowering or lifting the probe or the sample by 20% of the maximal extension of the piezo element.

In one embodiment, the level of the probe is adjusted, when the nanoscanner exhibits an extension that is 50 nm, 100 nm, 200 nm, 500 nm, 700 nm, 1µ, or 2 µm before the maximal extension or that is 50 nm, 100 nm, 200 nm, 500 nm, 700 nm, 1µ, or 2 µm before the maximal retraction. Such embodiment offers the advantage of keeping the extension of the nanoscanner in the optimal working.

In one embodiment, the level of the probe is adjusted by lowering or lifting the probe or the sample by at least 50 nm.

In one embodiment, the level of the probe is adjusted by lowering or lifting the probe or the sample by 3 µm. Such embodiment offers the advantage of restoring the optimal working range of the piezo element.

In some embodiments, the method of the invention further comprises the steps of:

monitoring a current angle between a second direction and the normal of a surface of the sample at a point of the surface, wherein the probe is moving along the second direction towards the point, and controlling the additional actuator and at least a second additional actuator such that the current angle approaches a predefined desired angle, wherein particularly the predefined desired angle is zero.

A normal to a surface at a point in the context of the present specification refers a line or a vector that is perpendicular to the surface of the sample at this point. In particular, the normal to a surface at a point is the same as a normal to the tangent plane to that surface at this point.

One advantage of the above described embodiment is the possibility to achieve an optimal, constantly perpendicular approach of the probe, particularly of the probe tip, towards the surface of a sample during a scanning probe microscopic measurement of a rough, uneven sample with a curved surface.

In some embodiments, the current angle is monitored by measuring both vertical and lateral (horizontal) deflections of the probe, wherein the deflections are monitored by an interferometer or by a laser focused on the probe back, and reflected onto a split photodiode, and wherein the photodiode registers the deflection of the probe as a voltage difference.

In some embodiments, the current angle is detected from the shape of a recorded vertical indentation force curve.

In some embodiments, the additional actuator, the second additional actuator and a third additional actuator are controlled such that the current angle approaches the predefined desired angle.

In one embodiment, the controlling of the additional actuator, the second additional actuator, and particularly also of the third additional actuator, is automatically performed.

In one embodiment, such automatically controlling is performed by the additional actuator, the second additional, and particularly also by the third additional actuator described above or by a programmed microprocessor that is configured to run the method according to any aspects or embodiments of the invention.

According to a further aspect of the invention, a method for controlling a scanning probe microscope having a probe with a tip for interacting with a sample and a nanoscanner for retaining the sample or the probe is provided, comprising the steps of:

monitoring a current angle between a direction and the normal of the surface of the sample at a point, wherein the probe is moving along the direction towards the point, and controlling a first additional actuator and at least a second additional actuator such that the current angle approaches a predefined desired angle, wherein particularly the predefined angle is zero.

The above described further aspect may be combined with any of the embodiments of the first aspect of the invention described above.

According to another aspect of the invention, a scanning probe microscope device is provided, comprising
- a probe having a tip for interacting with a sample, wherein the probe is configured to move the tip towards the sample along a first direction,
- a nanoscanner for retaining the sample or the probe, wherein
the scanning probe microscopy device comprises a means for monitoring the extension of the nanoscanner along the first direction as described above, an actuator for adjusting a level of the probe along the first direction and a controller for controlling the actuator, wherein the controller is configured to control the actuator so as to adjust the level of the probe, when the nanoscanner exhibits an extension below or above a definable threshold value.

The terms nanoscanner, probe, actuator, first direction and threshold value have the same meaning as described above.

In some embodiments, the actuator is configured to lower or lift the sample or the probe to prevent the probe tip from coming to close to the sample or from being to far way from the sample.

In some embodiments, such means for monitoring the extension of the nanoscanner is an optical system comprising a laser or an interferometer, a piezo electric sensor, which can register the movement of the piezo element as an electrical charge, or a sensor which is monitoring not only applied voltage but also the consequent real extension in order to ensure high precision of the extension.

In some embodiments, such means for monitoring the movement is the reading of the voltage or the electric current applied to the nanoscanner, which is necessary to move the nanoscanner along the first direction or, in particular, to maintain a constant force between tip and sample. For example, each piezo has specific sensitivity—nm/V which is used to convert applied voltage to the piezo distance/movement. When the applied voltage or electric current and resulting nanoscanner extension reach a specific level, then the adjusting the level of the probe as described above is activated.

A controller in the context of the present specification refers to a control unit that is connected to the actuator.

In some embodiments, the controller is a microprocessor or a computer.

In some embodiments, the nanoscanner is directly coupled to the probe or the sample. In case of the probe is part of a probe assembly, the nanoscanner alternatively may be directly coupled to the probe assembly.

In one embodiment, the nanoscanner is configured to maintain a constant probe tip-sample interaction force. Such force has been described above.

In one embodiment, the nanoscanner is configured to maintain a constant indentation depth of the probe tip into the sample.

In one embodiment, the nanoscanner is a piezo element. The term piezo element has the same meaning as described above.

In one embodiment, the probe is a cantilever. The term cantilever has the same meaning as described above.

In one embodiment, the nanoscanner is movable in a second direction which extends orthogonal to the said first direction described above.

In one embodiment, the device further comprises a sample holder for retaining the sample. The term sample holder has the same meaning as described above. In case of the sample is retained by the sample holder, the nanoscanner may be directly coupled to the sample holder.

In one embodiment, the device of the invention further comprises at least a second additional actuator, wherein in particular the additional actuator and the second additional actuator are configured to adjust a current angle between a second direction and the normal of a surface of the sample at a point of the surface, wherein the probe is configured to move along the second direction towards the point.

In one embodiment, the device of the invention further comprises a third additional actuator, wherein in particular the additional actuator, the second additional actuator and the third additional actuator are configured to adjust an angle between the second direction and the normal.

In one embodiment, the device of the invention further comprises an actuator control unit being configured to control the additional actuator, the second additional actuator, and particularly also the third additional actuator, such that the angle approaches a desired angle, wherein particularly the desired angel is zero.

In one embodiment, the actuator control unit is configured to monitor the angle between the second direction and the normal.

One advantage of the above described embodiments is that such device allows a scanning probe microscopic measurement, in particular an AFM-measurement, of a rough, uneven sample with a curved surface with an optimal, constantly perpendicular approach of the probe towards the sample surface.

Wherever alternatives for single separable features such as, for example, a probe, a nanoscanner or a scanning probe microscope are laid out herein as "embodiments", it is to be understood that such alternatives may be combined freely to form discrete embodiments of the invention disclosed herein.

The invention is further characterized by the following figures and examples, from which further features, advantages and embodiments of the invention can be derived:

EXAMPLES

Example 1

Figure 1:
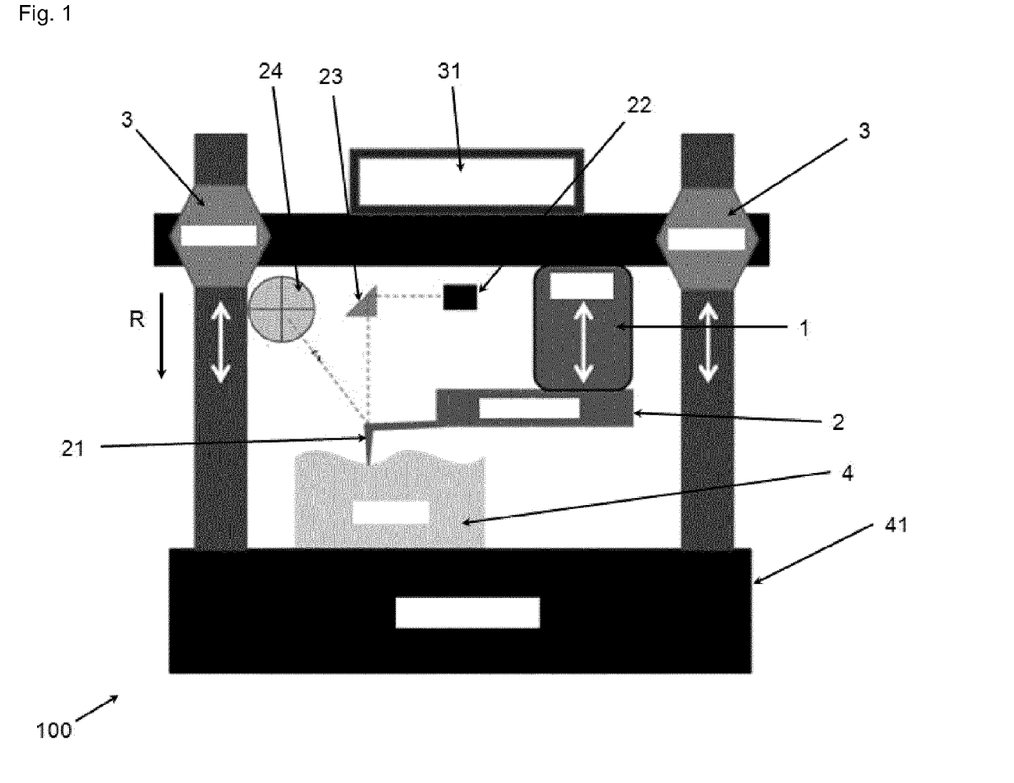
FIG. 1 shows a scheme of an embodiment of the invention with an AFM TOP-DOWN setup and with a vertical alignment component.

FIG. 1 shows the scheme of an embodiment of the invention in the TOP-DOWN setup, wherein the piezo element 1 is directly coupled to the cantilever 2. In case of the piezo element 1 is maximally extended along the first direction R and the contact between cantilever tip 21 and sample 4 surface is loose, the controller 31 starts the external motors 3 (actuator) to lower the cantilever tip 21 along the first direction R into the surface until desired extension of the piezo element 1 is reached. In case of the piezo element 1 is maximally retracted and the cantilever tip 21 is indented into the sample surface 4 with an undesired force, the controller 31 starts the external motors 3 to lift the cantilever 2 along the first direction R to restore a desired extension of the piezo element 1.

Example 2

Figure 2:
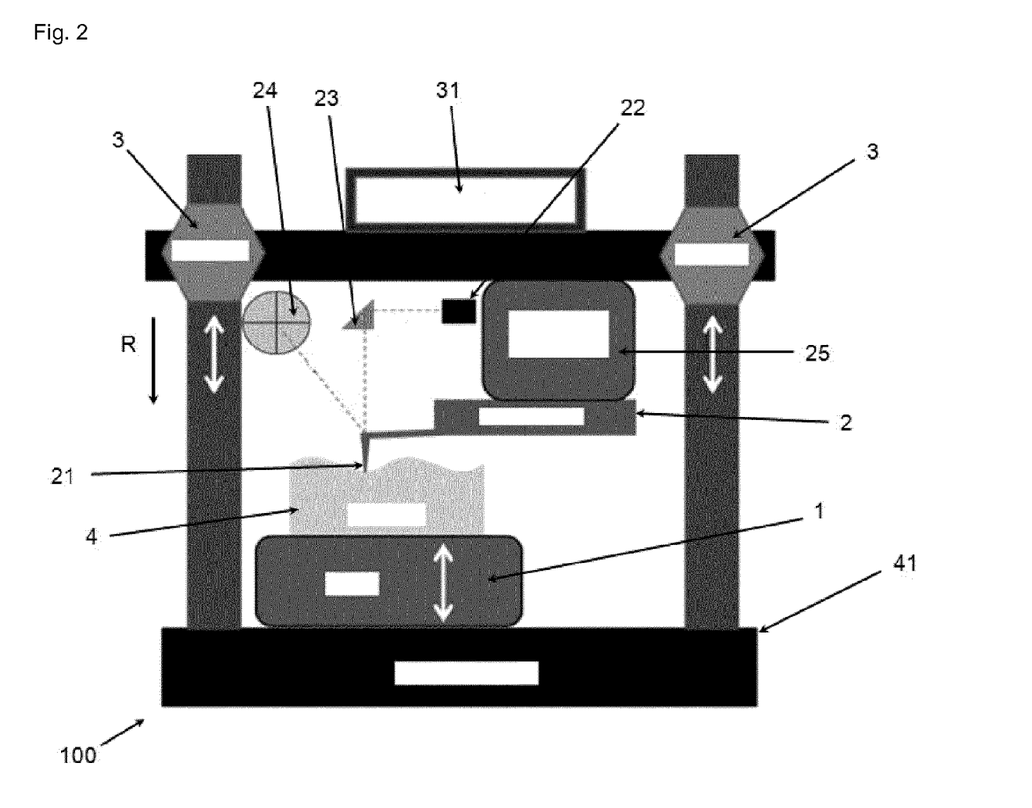
FIG. 2 shows a scheme of another embodiment of the invention with an AFM BOTTOM-UP setup and with a vertical alignment component.

FIG. 2 shows the scheme of another embodiment of the invention in the BOTTOM-UP setup, wherein the piezo element is directly coupled to the sample holder 41 and the cantilever 2 is attached to a cantilever holder 25.

Example 3

Figure 3:
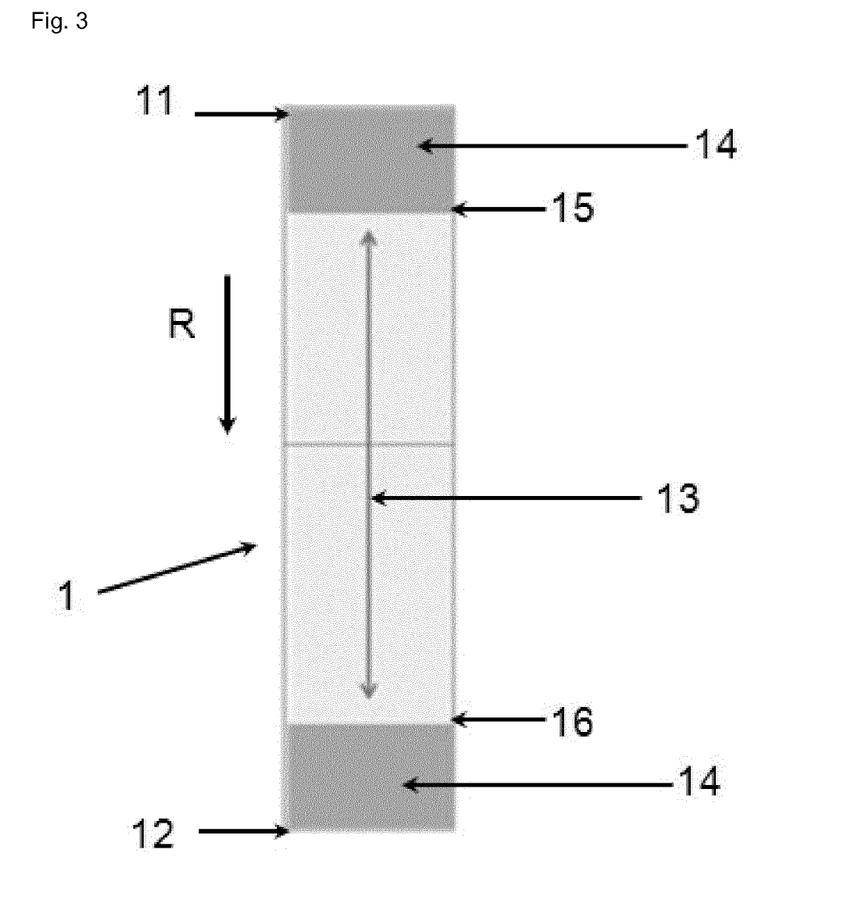
FIG. 3 shows a scheme of the piezo vertical movement.

FIG. 3 shows the scheme of the vertical piezo movement along the first direction R. The piezo element 1 is characterized by a maximal extension 12 and a maximal retraction 11. Between these to states there is the working range of the piezo element that can be divided into the optimal working range 13 and the non-optimal working range 14. A first threshold 15 is situated at the border between the optimal working range 13 and the non-optimal working range 14 on the side of maximally retraction 11. A second threshold 16 is situated at the border between the optimal working range 13 and the non-optimal working range 14 on the side of maximally extension 12.

When the sample is getting too high and the piezo element 1 is retracted to the threshold 15, e.g. less than 20% of or 2 μm from its full extension range, the controller 31 will activate the motors. The motors will move upwards and restore optimal working distance 13 of the piezo (e.g. between 20% and 80% of the maximum extension 12 or between the initial 2 μm and the last 2 μm of the maximal extension 12) (FIG. 3). If the piezo is extended more than 80% or the last 2 μm of the full extension range at threshold 16, the controller 31 will again start the motors 3, but this time they will move downwards to restore optimal piezo working distance 13 (FIG. 3). Typically, the cantilever 2 is lowered or lifted by e.g. 3 μm if one is working with a piezo element 1 of 15 μm full extension range. This value can be adjusted by the user to the given combination of AFM and motors 3.

Example 4

Figure 4:
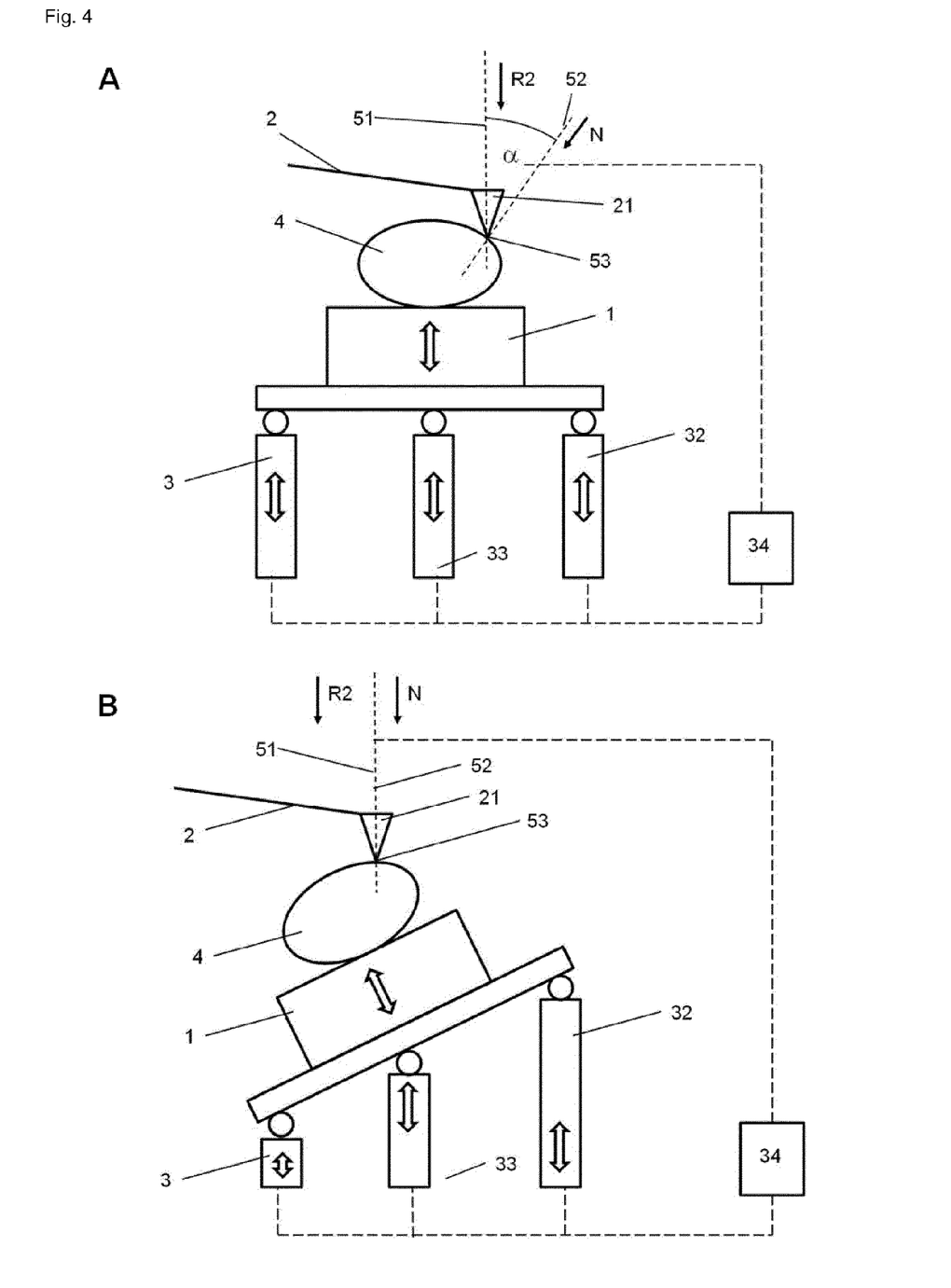
FIG. 4 shows a scheme of an embodiment of the invention with an AFM-BOTTOM-UP setup and with components for angle adjustment with: A—situation before angle adjustment; and B—situation after angle adjustment.

FIG. 4 a scheme of the an embodiment of the invention, wherein this embodiment related to the angle adjustment of the angle α between the moving direction R2 of the cantilever 2, in particular the tip 21 of the cantilever 2, and the surface of the sample 4 to be measured.

Figure 5:
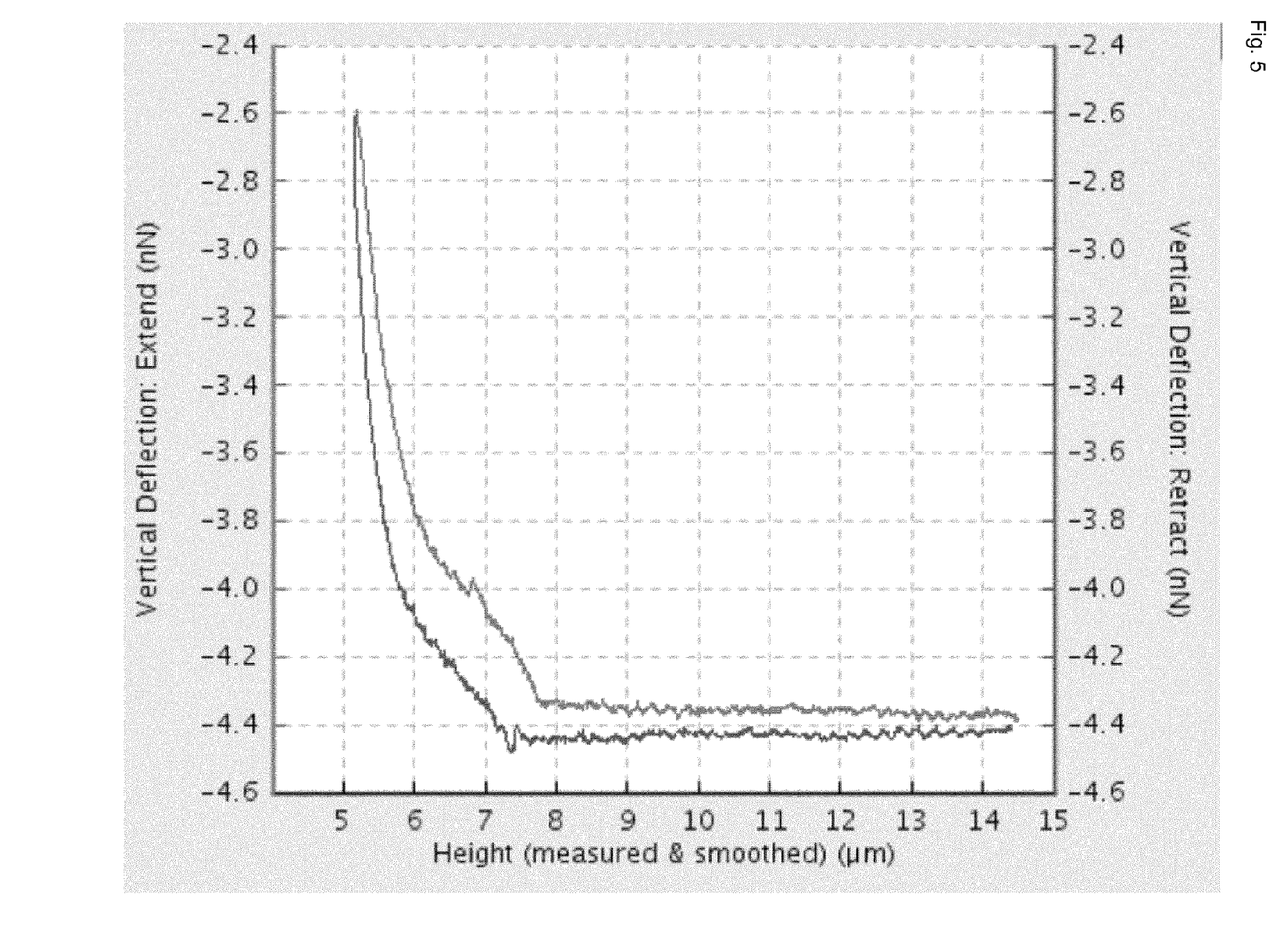
FIG. 5 shows a force-distance curve of an AFM measurement with a non-optimal (undesired) angle; the X-axis is showing the distance (height) and the Y-axis the force; light grey line—loading (trace) curve; dark grey line—unloading (retrace) curve.

FIG. 4A shows a situation, wherein the cantilever 2 is not perpendicularly orientated to the surface of the sample 4 leading to a non-optimal approach of the cantilever 2 towards the sample 4 and inaccurate results of the AFM-measurement. The tip 21 of the cantilever 2 contacts the sample at point 53, which is the intersection between the axis 51 being parallel to the moving direction R2 of the cantilever 2 and the axis 52 being parallel to the normal N, which is a vector or a line perpendicular to the surface of the sample 4 at this point 53. A desired angle α is zero meaning that the moving direction R2 of the probe 2 is parallel to the normal N, or axis 51 is parallel to axis 52. The result of an AFM measurement with such non-optimal, undesired angle is shown in FIG. 5.

Figure 6:
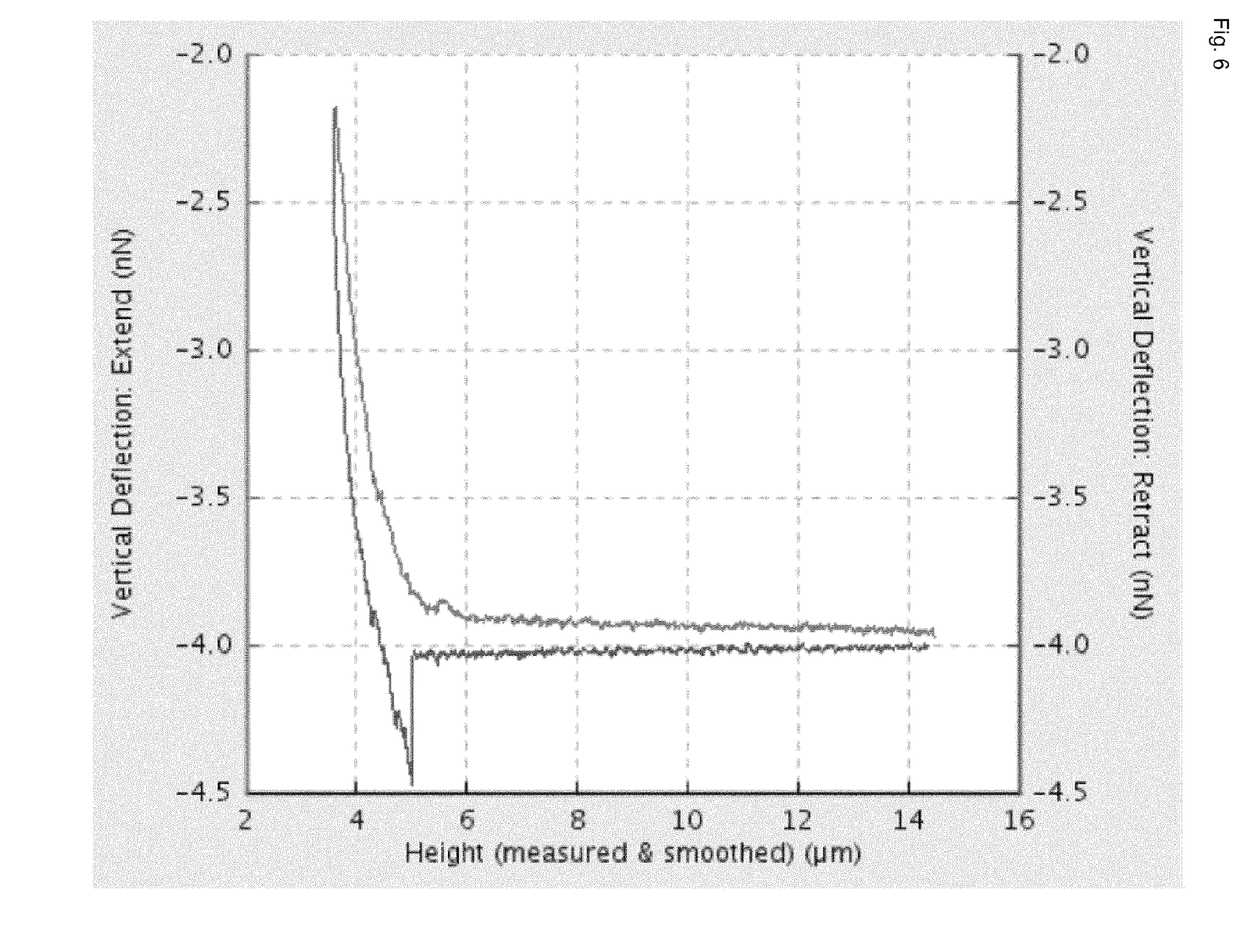
FIG. 6 shows a force-distance curve of an AFM measurement with a corrected, optimal (desired) angle; the X-axis is showing the distance (height) and the Y-axis the force; light grey line—loading (trace) curve; dark grey line—unloading (retrace) curve.

This adjustment of the angle α can be achieved by help a first actuator 3 and a second actuator 32, and optionally a third actuator 33 (FIG. 4 B), wherein the sample 4 is tilted together with the nanoscanner 1 by the retraction of the first actuator 3 and expansion of the second actuator 32, and optionally by expansion or retraction of the third actuator 33. In this case, the normal N approaches the moving direction R2 of the probe 2, until moving direction R2 and the normal N are essentially parallel. The extension or retraction of the first actuator 3, the second actuator 32 and the third actuator 33 as well as the monitoring of the angle α are operated by an actuator control unit 34. The result of an AFM measurement with such corrected, optimal, desired angle is shown in FIG. 6.

Alternatively, also the probe 2 may be tilted by a first actuator 3 and a second actuator 32 attached to the probe 2 such that the moving direction R2 of the probe 2 approaches the normal N, until the moving direction R2 and the normal N are essentially parallel.

The angle α can be monitored by measuring signal from the photo-diode 24, whereby a laser is focused on the cantilever back, and reflected onto the split photodiode 24, where both the vertical and the lateral deflections of the cantilever 2 are monitored. A substantial lateral deflection of the cantilever can be observed by a shift of the reflected laser beam on the photodiode 24. Therefore, if the lateral deflection of the cantilever 2 is substantial during vertical approach along the moving direction R2 the angle α needs to be adjusted. In addition, depending on the shape of recorded vertical indentation force curve it is possible to detect if the angle α is optimal or not.

| List of reference elements | |
|---|---|
| 100 | Atomic force microscope of invention |
| 1 | Piezo element |
| 11 | Maximally retraction |
| 12 | Maximally extension |
| 13 | Optimal working range |
| 14 | Non-optimal working range |
| 15 | Threshold to lift the cantilever |
| 16 | Threshold to lower the cantilever |
| 2 | Cantilever |
| 21 | Cantilever tip |
| 22 | Laser |
| 23 | Mirror |
| 24 | Photodiode |
| 25 | Cantilever holder |
| 3 | Motor |
| 31 | Controller |
| 32 | Second motor (second additional actuator) |
| 33 | Third motor (third additional actuator) |
| 34 | actuator control unit |
| 4 | Sample |
| 41 | Sample holder |
| 51 | Axis along the second direction |
| 52 | Axis along the normal |
| 53 | Point at the surface of the sample (intersection of 51 and 53) |
| R | First direction |
| R2 | Second direction |
| N | Normal |
| α | Angle between 51 and 53 |

The invention claimed is:
1. A scanning probe microscopy device, comprising
a probe having a tip for interacting with a sample, wherein said probe is configured to move said tip towards said sample along a first direction;

a nanoscanner for retaining and moving one of said sample or said probe along said first direction;

a tracking means for monitoring the extension of said nanoscanner along said first direction; and a plurality of actuators for adjusting a level of at least one of said probe or said sample along said first direction, wherein said tracking means, said plurality of actuators and said nanoscanner are structurally and operatively integrated within the device to correct for extension along-said first direction in amounts greater or smaller than a predetermined threshold value.

2. The scanning probe microscopy device of claim 1, further comprising a controller for controlling said plurality of actuators so as to adjust said level of at least one of said probe, said nanoscanner, or said sample, thereby correcting for the extension of said nanoscanner in amounts greater or smaller than a predetermined threshold value.

3. The scanning probe microscopy device of claim 1, wherein at least a first actuator of said plurality of actuators is configured to move said nanoscanner, said sample, or said probe along said first direction, when said nanoscanner exhibits an extension below or above a predetermined threshold value.

4. The scanning probe microscopy device of claim 1, wherein a first actuator and a second actuator of said plurality of actuators are configured to move at least one of said probe, said nanoscanner, or said sample along said first direction, when said nanoscanner exhibits an extension greater or smaller than a predetermined threshold value.

5. The scanning probe microscopy device of claim 1, wherein a first and a second actuator of said plurality of actuators are configured to lower or raise one of said sample, said sample holder, said probe and said probe assembly to prevent said probe tip from approaching said sample beyond a predetermined distance.

6. The device of claim 1, wherein said nanoscanner is a piezo element.

7. The device of claim 1, wherein said probe is a cantilever.

8. The device of claim 1, wherein said nanoscanner is further movable in a second direction that is orthogonal to said first direction.

9. The device of claim 1, wherein said plurality of actuators include at least a first actuator and a second actuator, wherein said first actuator and said second actuator are configured to adjust a current angle between a second direction and a normal to a surface of said sample at a point of said surface, wherein said probe is configured to move along said second direction towards said point.

10. The device of claim 9, wherein said plurality of actuators comprises a third actuator, wherein said first, second and third actuators are configured to adjust said current angle between said second direction and said normal.

11. The device of claim 10, further comprising an actuator control unit configured to control said first, second and third actuators, such that said current angle approaches a desired angle.

12. The device of claim 11 wherein said desired angle is zero.

13. The device of claim 1 wherein said tracking mechanism is a laser system comprising a laser and a photodetector, an interferometer, a piezo electric sensor which can register the movement of the piezo element as an electrical charge, or a sensor which is monitoring not only applied voltage but also the consequent real extension in order to ensure high precision of the extension.

14. A method for controlling a scanning probe microscopy device, the device constructed as recited in claim 1, the method comprising the steps of:

monitoring the extension of said nanoscanner along said first direction; and adjusting a level of said probe or said sample along said first direction using a plurality of actuators, when said nanoscanner exhibits an extension greater or smaller than a threshold value.

15. The method of claim 14, wherein said nanoscanner is a piezo element.

16. The method of claim 14, wherein said probe is a cantilever.

17. The method of claim 14, wherein said step of adjusting is performed by lowering or raising one of said probe or said sample, wherein said first actuator and said second actuator of said plurality of actuators are configured and coupled to move one of said sample, a sample holder comprising said sample, said probe or a probe assembly comprising said probe, along said first direction.

18. The method of claim 14, wherein said level is adjusted when said nanoscanner exhibits an extension less than 20% or more than 80% of its maximal extension.

19. The method of claim 14, wherein said level is adjusted by lowering or raising said probe or said sample by 10 to 30% of the maximal extension of said nanoscanner.

20. The method of claim 14, wherein said level is adjusted whenever said nanoscanner exhibits an extension that is 50 nm, 100 nm, 200 nm, 500 nm, 700 nm, 1 µm, or 2 µm smaller than said nanoscanner maximal extension or larger than said nanoscanner maximal retraction.

21. The method of claim 14, wherein said level is adjusted by lowering or raising said probe or said sample by a distance ranging from about 50 nm to about 3 µm.

22. The method of claim 14, further comprising the steps of monitoring a current angle between a second direction and the normal to a surface of said sample at a point of said surface, wherein said probe moves along said second direction towards said point; and controlling said first actuator and at least a second actuator such that said current angle approaches a predefined desired angle.

23. The method of claim 22 wherein said predefined desired angle is zero.

24. The method of claim 22, wherein said first actuator, said second actuator and a third actuator are controlled such that said current angle approaches said predefined desired angle.

* * * * *